(12) United States Patent
Won et al.

(10) Patent No.: US 11,235,769 B2
(45) Date of Patent: Feb. 1, 2022

(54) VEHICLE CONTROL METHOD

(71) Applicants: Hyundai Motor Company, Seoul (KR); Kia Motors Corporation, Seoul (KR)

(72) Inventors: Chan Hee Won, Seoul (KR); Jung Sup Byun, Seongnam-Si (KR); Seong Kyu Park, Hwaseong-Si (KR); Seong Hwan Cheong, Suwon-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 252 days.

(21) Appl. No.: 16/582,100

(22) Filed: Sep. 25, 2019

(65) Prior Publication Data
US 2020/0353928 A1    Nov. 12, 2020

(30) Foreign Application Priority Data
May 9, 2019  (KR) ......................... 10-2019-0054278

(51) Int. Cl.
*B60W 30/18*   (2012.01)
*B60W 10/06*   (2006.01)

(52) U.S. Cl.
CPC ...... *B60W 30/18072* (2013.01); *B60W 10/06* (2013.01); *B60W 30/18018* (2013.01);
(Continued)

(58) Field of Classification Search
CPC ................. B60W 30/00; B60W 30/18; B60W 30/18009; B60W 30/18018;
(Continued)

(56) References Cited

U.S. PATENT DOCUMENTS

| 2008/0071437 A1* | 3/2008 | Hirata | ................... B60W 10/02 701/22 |
| 2010/0145562 A1* | 6/2010 | Moran | ................ F02N 11/0837 701/22 |

(Continued)

FOREIGN PATENT DOCUMENTS

KR    10-2017-0085223 A    7/2017

*Primary Examiner* — Tyler J Lee
*Assistant Examiner* — Michael Allen Brace, Jr.
(74) *Attorney, Agent, or Firm* — Morgan, Lewis & Bockius LLP

(57) ABSTRACT

A vehicle control method may include determining by a controller, a state of a brake pedal wherein a controller is configured to determine during performing an SSC control mode whether a brake pedal is in an ON state; determining, by the controller, overlap of control modes wherein when it is determined in the determining by a controller, a state of a brake pedal that the brake pedal is in the ON state, the controller is configured to determine whether conditions for performing an extended ISG control mode are satisfied; and converting, by the controller, a control mode wherein when it is determined in the determining, by the controller, overlap of control modes that the conditions for performing the extended ISG control mode are satisfied, the controller terminates the SSC control mode being performed and converts the current control mode to the extended ISG control mode.

10 Claims, 4 Drawing Sheets

(52) U.S. Cl.
CPC ..... *B60W 2510/18* (2013.01); *B60W 2540/10* (2013.01); *B60W 2540/12* (2013.01)

(58) Field of Classification Search
CPC ........... B60W 30/18072; B60W 10/00; B60W 10/04; B60W 10/06; B60W 2510/00; B60W 2510/18; B60W 2540/00; B60W 2540/10; B60W 2540/12
See application file for complete search history.

(56) References Cited

U.S. PATENT DOCUMENTS

| | | | |
|---|---|---|---|
| 2014/0288807 A1* | 9/2014 | Tribulowski | ............ F02D 29/02 |
| | | | 701/112 |
| 2014/0309912 A1* | 10/2014 | Hirano | ................ F02N 11/0833 |
| | | | 701/112 |
| 2019/0118820 A1* | 4/2019 | Akita | .............. B60W 30/18072 |

* cited by examiner

VEHICLE CONTROL METHOD

CROSS-REFERENCE(S) TO RELATED APPLICATIONS

The present application claims priority to Korean Patent Application No. 10-2019-0054278, filed on May 9, 2019, the entire contents of which is incorporated herein for all purposes by this reference.

BACKGROUND OF THE DISCLOSURE

Field of the Disclosure

The present invention relates to a vehicle control method, and more particularly, to a control technique for a vehicle provided with an internal combustion engine as a power source.

Description of Related Art

In a vehicle provided with an internal combustion engine, it is important to reduce $CO_2$ and improve fuel economy by securing longer mileage while reducing fuel consumption as much as possible.

A start-stop coasting (SSC) control system makes it possible to increase coasting distance of a vehicle, reduce $CO_2$ and improve fuel economy by functioning to turn off an engine and keep a clutch open in a certain coasting situation (e.g., an accelerator pedal is in an OFF state, a brake pedal is in an OFF state, and vehicle speed is in a range from 120 to 40 kilometer per hour (kph)).

An extended idle stop and go (ISG) control system also makes it possible to reduce $CO_2$ and improve fuel economy by functioning to turn off the engine in a deceleration section (e.g., a brake pedal is in an ON state and vehicle speed is 25 kph or less) when a driver intends to stop the vehicle.

On the other hand, the SSC control system has been developed recently to enlarge its maximum operative range, which is on a trend to enlarge from a conventional range from 120 to 40 kph to a range from 120 to 15 kph.

In the instant case, an SSC control mode and an extended ISG control mode are therefore overlapped in the vehicle speed range of 25 to 15 kph, with the result that unnecessary engine restart may occur.

For example, as illustrated in FIG. 1, when the SSC control mode and the extended ISG control mode are overlapped and connected in the vehicle speed range as mentioned above, if the brake pedal is in an ON state within the vehicle speed of 25 to 15 kph by being depressed by the driver, as shown in A of the figure, restart of the engine is prohibited even when the SSC control mode is released by the ON state of the brake pedal, because the extended ISG control mode is already started and operated. However, if the brake pedal is in the ON state at a vehicle speed slightly higher than the vehicle speed of 25 kph by being depressed by the driver, as shown in B of the figure, the SSC control mode is released and the engine restarts. Subsequently, when the vehicle speed reaches 25 kph or less, the extended ISG control mode is started and the engine is turned off again.

As a result, in the case of B, as the vehicle speed decreases immediately after the engine is restarted, the engine may be turned off immediately through the extended ISG control mode. Therefore, restart of the engine in the present situation does not contribute to driving force of the vehicle. Rather, it becomes an unnecessary restart operation that increases fuel consumption and $CO_2$ emissions. Furthermore, vehicle noise and vibration are caused due to restart and stop operations of the engine.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle control method configured for preventing unnecessary restart operation of an engine in a situation where an SSC control mode and an extended ISG control mode are overlapped and connected while a vehicle is traveling so that unnecessary generation of $CO_2$ and fuel consumption may be prevented and vehicle noise and vibration due to restart and stop operations of the engine may be eliminated, greatly improving the merchantability of the vehicle.

In accordance with one aspect of the present invention, there may be provided a vehicle control method including: determining by a controller, a state of a brake pedal wherein a controller is configured to determine during performing an SSC control mode whether a brake pedal is in an ON state; determining, by the controller, overlap of control modes wherein when it is determined in the determining by a controller, a state of a brake pedal that the brake pedal is in the ON state, the controller is configured to determine whether conditions for performing an extended ISG control mode are satisfied; and converting, by the controller, a control mode wherein when it is determined that the conditions for performing the extended ISG control mode are satisfied, the controller terminates the SSC control mode being performed and converts the current control mode to the extended ISG control mode.

The controller may not immediately terminate the SSC control mode when the brake pedal is determined to be in the ON state during performing the SSC control mode but terminate the SSC control mode when the brake pedal is determined to be in an OFF state again.

When it is determined in the determining, by the controller, overlap of control modes that the conditions for performing the extended ISG control mode are not satisfied, the controller may be configured to determine whether conditions for releasing the SSC control mode other than the state of the brake pedal are satisfied and, if it is determined to be satisfied, release the SSC control mode being performed.

The conditions for releasing the SSC control mode other than the state of the brake pedal may be determined to be satisfied when an accelerator pedal is in an ON state or vehicle speed is out of a range of a vehicle speed in which the SSC control mode is performed.

The controller may be configured to determine whether the conditions for releasing the SSC control mode other than the state of the brake pedal are satisfied and, if it is determined not to be satisfied, determine the state of the brake pedal and then, only when the brake pedal is determined to be in an OFF state again, release the SSC control mode being performed.

The controller may be configured to determine whether the conditions for releasing the SSC control mode other than the state of the brake pedal are satisfied and, if it is determined not to be satisfied, determine the state of the brake pedal and then, as far as the brake pedal is not in an OFF state again, continue to maintain the SSC control mode being performed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
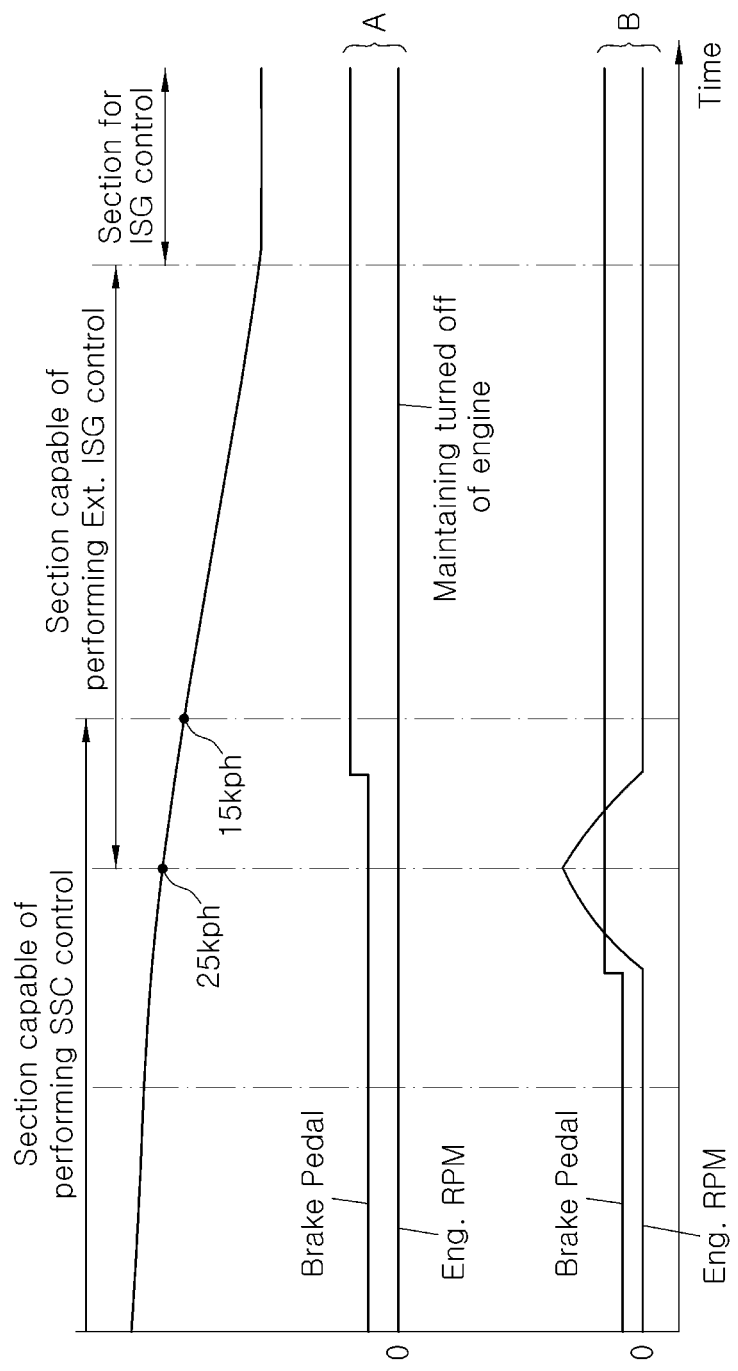
FIG. 1 is a graph illustrating an overlap state of an SSC control mode and an extended ISG control mode in the related art.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
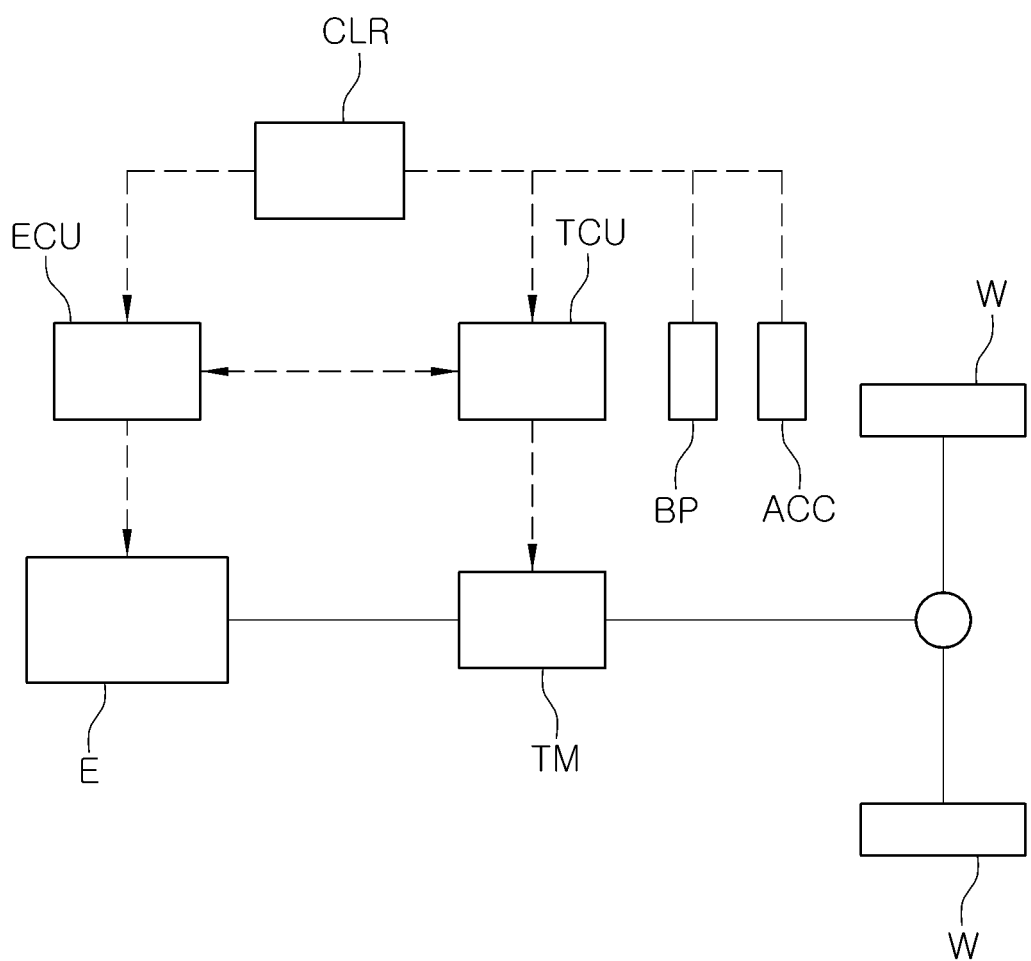
FIG. 2 is a block diagram illustrating a configuration of a vehicle to which embodiments of the present invention may be applied.

Referring to FIG. 2, a vehicle to which embodiments of the present invention can be applied is configured such that power of an engine E is transmitted to drive wheels W through a transmission TM, the engine E is controlled by an ECU, the transmission TM is controlled by a Transmission Control Unit (TCU), and the ECU and the TCU exchange information with each other such that control requests can be made according to their needs.

The vehicle includes a brake pedal BP and an accelerator pedal ACC and, in an exemplary embodiment of the present invention, sensors are disposed to detect the state of the brake pedal BP and the accelerator pedal ACC.

In FIG. 2, both the ECU and the TCU are configured to be controlled by a controller CLR. A controller mentioned below herein refers to the controller CLR.

In practice, the controller may be implemented internally in the ECU or the TCU itself. However, to avoid any confusion and provide clear understanding of the present invention, the controller that performs control modes featured in an exemplary embodiment of the present invention is expressed as a separate configuration.

Figure 3:
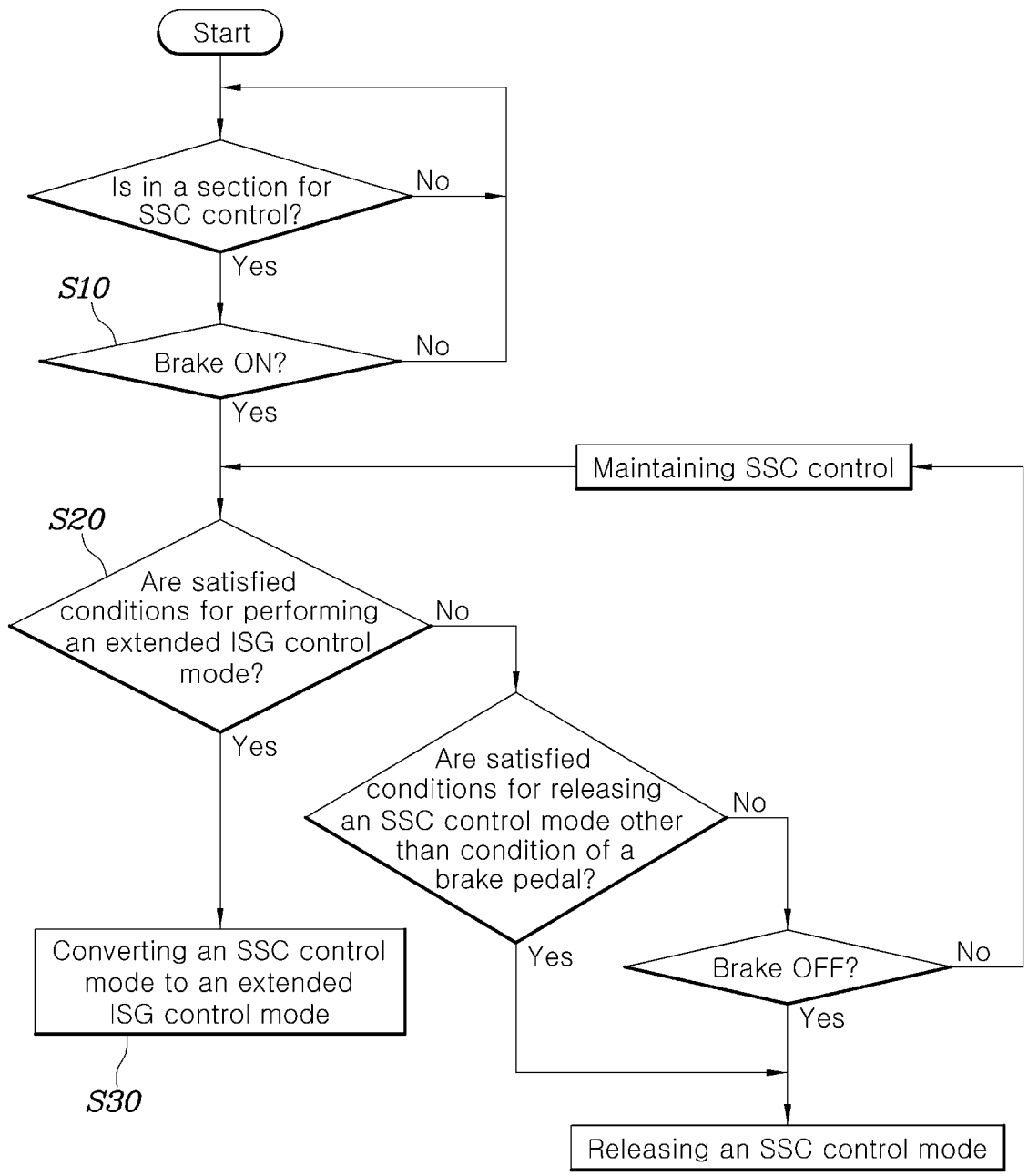
FIG. 3 is a flow chart illustrating an exemplary embodiment of a vehicle control method according to an exemplary embodiment of the present invention.

Referring to FIG. 3, a vehicle control method according to an exemplary embodiment of the present invention includes determining by a controller, a state of a brake pedal BK BP S10 wherein a controller CLR determines during performing an SSC control mode whether a brake pedal BK is in an ON state; determining, by the controller, overlap of control modes S20 wherein when it is determined in the determining by a controller, a state of a brake pedal BK S10 that the brake pedal BK is in the ON state, the controller CLR determines whether conditions for performing an extended ISG control mode are satisfied; and converting, by the controller, a control mode S30 wherein when it is determined in the determining, by the controller, overlap of control modes S20 that the conditions for performing the extended ISG control mode are satisfied, the controller CLR terminates the SSC control mode being performed and converts the current control mode to the extended ISG control mode.

In other words, the exemplary embodiment of the present invention is configured such that if it is determined during performing the SSC control mode that the brake pedal BK is depressed, the controller first identifies whether conditions for performing the extended ISG control mode are satisfied and, if the conditions are determined to be satisfied, converts the current control mode to the extended ISG control mode, eliminating ambiguity of control due to overlap of the control modes.

Figure 4:
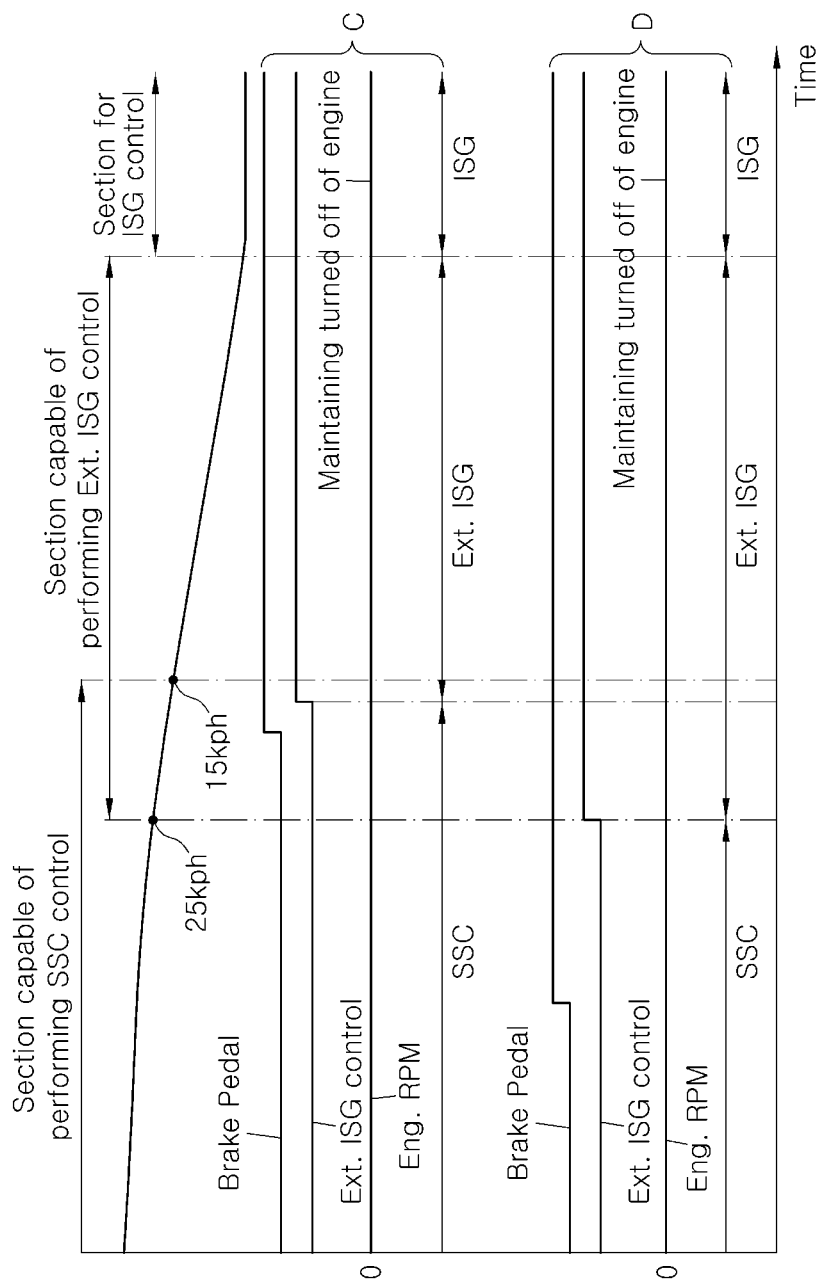
FIG. 4 is a graph illustrating an overlap state of an SSC control mode and an extended ISG control mode, according to an exemplary embodiment of the present invention.

As shown in C of FIG. 4, when a driver depresses the brake pedal BK in a state where the SSC control mode and the extended ISG control mode overlap with each other, the controller CLR determines that it is possible to perform the extended ISG control mode in the present situation, and terminates the SSC control mode that has been performed so far and converts the current control mode to the extended ISG control mode, so that ambiguity of control due to overlap of the controls is eliminated.

Furthermore, the present exemplary embodiment of the present invention is configured such that the controller CLR does not immediately terminate the SSC control mode when the brake pedal BK is determined to be in the ON state during performing the SSC control mode but terminates the SSC control mode being performed when the brake pedal BK is determined to be in an OFF state again.

For example, as shown in D of FIG. 4, when the driver depresses the brake pedal BK in a situation where only the SSC control mode is performed before the SSC control mode overlaps with the extended ISG control mode, the controller CLR continues to maintain the SSC control mode being performed, unless the brake pedal BK is in an OFF state again.

It is natural that the case of D also exemplifies that the SSC control mode continues to be maintained and then converted to the extended ISG control mode immediately after it is determined that the extended ISG control can be performed.

When it is determined in the determining, by the controller, overlap of control modes S20 that the conditions for performing the extended ISG control mode are not satisfied, the controller CLR determines whether conditions for releasing the SSC control mode other than the condition of the brake pedal BK are satisfied and, if it is determined to be satisfied, releases the SSC control mode being performed.

In the instant case, the conditions for releasing the SSC control mode other than the state of the brake pedal BK may be set as having been satisfied when an accelerator pedal ACC is in an ON state or vehicle speed is out of a range of a vehicle speed in which the SSC control mode is performed.

Therefore, even in a situation where the SSC control mode that has been basically performed by the controller CLR is required to be maintained because it is determined in the determining, by the controller, overlap of control modes S20 that the conditions for performing the extended ISG control mode are not satisfied, when the driver depresses the accelerator pedal or the vehicle speed is out of the range of a vehicle speed in which the SSC control mode is performed, the SSC control mode is terminated.

In the instant case, a normal vehicle speed range of 120 to 40 kph in the related art is set as the range of a vehicle speed in which the SSC control mode is performed, as described above. However, the range of a vehicle speed can be changed according to design of vehicles and the present invention is not limited thereto.

The controller CLR determines whether the conditions for releasing the SSC control mode other than the condition of the brake pedal BK are satisfied and, if it is determined not to be satisfied, determines the state of the brake pedal BK as described above and then, only when the brake pedal BK is determined to be in an OFF state, releases the SSC control mode being performed and, as far as the brake pedal BK is not in an OFF state again, continues to maintain the SSC control mode being performed.

Therefore, unnecessary restart of the engine is prevented because the SSC control mode is not terminated even when the brake pedal is in the ON state as shown in D of FIG. 4 and the present state is maintained continuously as the SSC control mode is converted to the extended ISG control mode, so that generation of $CO_2$ and deterioration of fuel economy, which were caused by unnecessary restart operation of the engine in the related art, may be prevented and vehicle noise and vibration due to restart and stop operations of the engine may be eliminated, greatly improving the merchantability of the vehicle.

As described above, embodiments of the present invention makes it possible to prevent unnecessary restart operation of an engine in a situation where an SSC control mode and an extended ISG control mode are overlapped and connected while a vehicle is traveling so that unnecessary generation of $CO_2$ and fuel consumption may be prevented and vehicle noise and vibration due to engine restart and stop operations may be eliminated, greatly improving the merchantability of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle control method comprising:
    determining by a controller, a state of a brake pedal of a vehicle, in which the controller is configured to determine, during performing a start-stop coasting (SSC) control mode, when the brake pedal is in an ON state;
    determining, by the controller, overlap of the SSC control mode and an extended idle stop and go (ISG) control mode, in which upon determining that the state of the brake pedal is in the ON state, the controller is configured to determine when conditions for performing the extended idle stop and go (ISG) control mode are satisfied; and
    converting, by the controller, a current control mode of the vehicle, in which upon determining that the conditions for performing the extended ISG control mode are satisfied, the controller is configured to terminate the SSC control mode and convert the current control mode to the extended ISG control mode,
    wherein upon determining that the conditions for performing the extended ISG control mode are not satisfied, the controller is configured to determine when conditions for releasing the SSC control mode other than the state of the brake pedal are satisfied and, when the conditions for releasing the SSC control mode is determined to be satisfied, the controller is configured to releases the SSC control mode.

2. The vehicle control method of claim 1,
    wherein the controller is configured to maintain the SSC control mode when the state of the brake pedal is determined to be in the ON state during performing the SSC control mode until the state of the brake pedal is determined to be in an OFF state again to terminate the SSC control mode when the state of the brake pedal is determined to be in the OFF state again.

3. The vehicle control method of claim 1,
    wherein the conditions for releasing the SSC control mode other than the state of the brake pedal are determined to be satisfied when an accelerator pedal is in an ON state or a vehicle speed is beyond a predetermined speed range in which the SSC control mode is performed.

4. The vehicle control method of claim 1,
    wherein the controller is configured to determine when the conditions for releasing the SSC control mode other than the state of the brake pedal are satisfied and, when the conditions for releasing the SSC control mode other than the state of the brake pedal is determined not to be satisfied, the controller is configured to determine the state of the brake pedal and then, when the state of the brake pedal is determined to be in an OFF state again, to release the SSC control mode.

5. The vehicle control method of claim 1,
    wherein the controller is configured to determine when the conditions for releasing the SSC control mode other than the state of the brake pedal are satisfied and, when the conditions for releasing the SSC control mode other than the state of the brake pedal is determined not to be satisfied, the controller is configured to determine the state of the brake pedal and then, as far as the state of the brake pedal is not in an OFF state again, to maintain the SSC control mode.

6. A vehicle comprising:
an engine;
an accelerator pedal;
a brake pedal; and
a controller electrically-engaged to the engine, the brake pedal and the accelerator pedal, wherein the controller is configured of:
  determining a state of the brake pedal, in which the controller is configured to determine, during performing a start-stop coasting (SSC) control mode, when the brake pedal is in an ON state;
  determining overlap of the SSC control mode and an extended idle stop and go (ISG) control mode, in which upon determining that the state of the brake pedal is in the ON state, the controller is configured to determine when conditions for performing the extended idle stop and go (ISG) control mode are satisfied; and
  converting a current control mode of the vehicle, in which upon determining that the conditions for performing the extended ISG control mode are satisfied, the controller is configured to terminate the SSC control mode and convert the current control mode to the extended ISG control mode,
wherein upon determining that the conditions for performing the extended ISG control mode are not satisfied, the controller is configured to determine when conditions for releasing the SSC control mode other than the state of the brake pedal are satisfied and, when the conditions for releasing the SSC control mode is determined to be satisfied, the controller is configured to releases the SSC control mode.

7. The vehicle of claim 6,
wherein the controller is configured to maintain the SSC control mode when the state of the brake pedal is determined to be in the ON state during performing the SSC control mode until the state of the brake pedal is determined to be in an OFF state again to terminate the SSC control mode when the state of the brake pedal is determined to be in the OFF state again.

8. The vehicle of claim 6,
wherein the conditions for releasing the SSC control mode other than the state of the brake pedal are determined to be satisfied when the accelerator pedal is in an ON state or a vehicle speed is beyond a predetermined speed range in which the SSC control mode is performed.

9. The vehicle of claim 6,
wherein the controller is configured to determine when the conditions for releasing the SSC control mode other than the state of the brake pedal are satisfied and, when the conditions for releasing the SSC control mode other than the state of the brake pedal is determined not to be satisfied, the controller is configured to determine the state of the brake pedal and then, when the state of the brake pedal is determined to be in an OFF state again, to release the SSC control mode.

10. The vehicle of claim 6,
wherein the controller is configured to determine when the conditions for releasing the SSC control mode other than the state of the brake pedal are satisfied and, when the conditions for releasing the SSC control mode other than the state of the brake pedal is determined not to be satisfied, the controller is configured to determine the state of the brake pedal and then, as far as the state of the brake pedal is not in an OFF state again, to maintain the SSC control mode.

* * * * *